Jan. 11, 1955  C. DUMELIN  2,698,947
KNEE COUPLING FOR ARTIFICIAL LEGS
Filed Sept. 8, 1952  3 Sheets-Sheet 1

Charles Dumelin
INVENTOR.

Jan. 11, 1955  C. DUMELIN  2,698,947
KNEE COUPLING FOR ARTIFICIAL LEGS
Filed Sept. 8, 1952  3 Sheets-Sheet 2
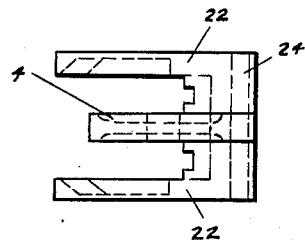
FIG. 10
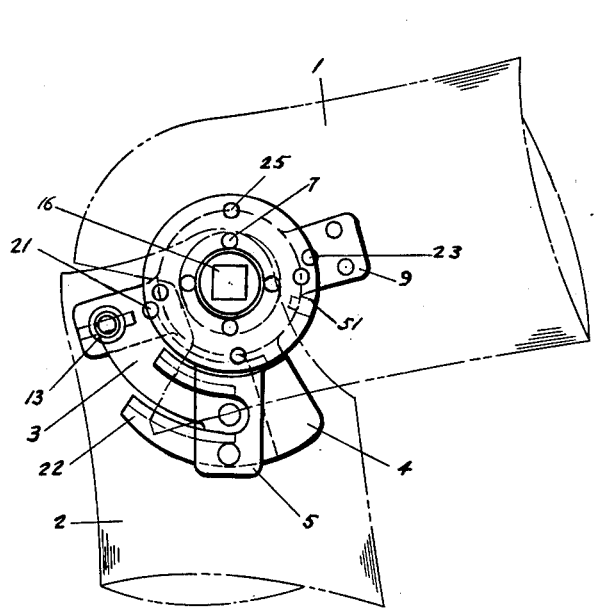
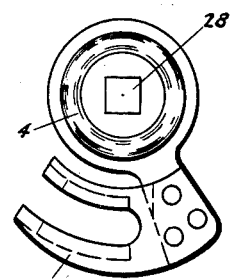
FIG. 9
FIG. 6
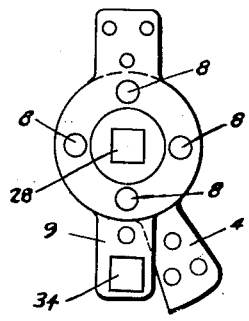
FIG. 7
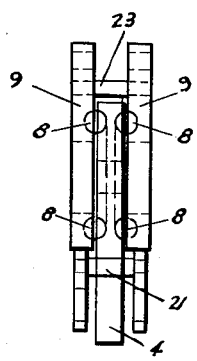
FIG. 8
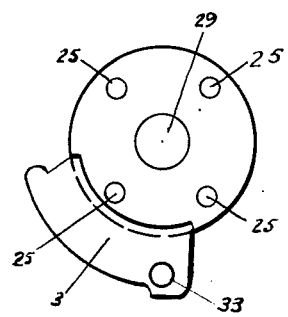
FIG. 11
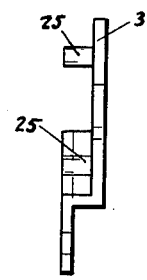
FIG. 12
*Charles Dumelin*
INVENTOR.

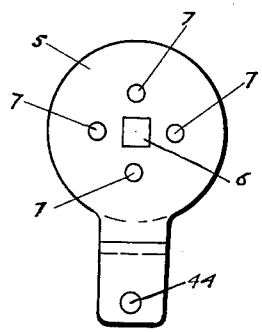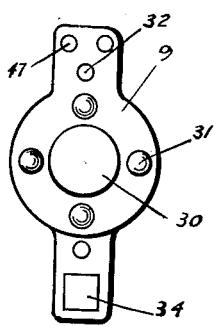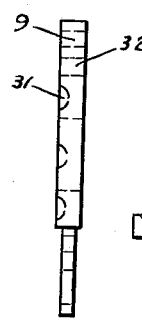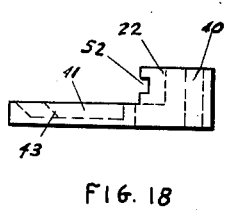
FIG.13  FIG.14  FIG.15  FIG.16  FIG.18
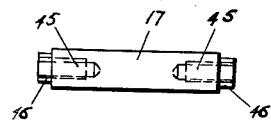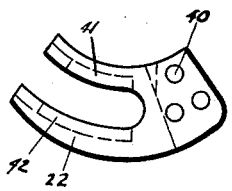
FIG.21  FIG.22  FIG.27  FIG.17
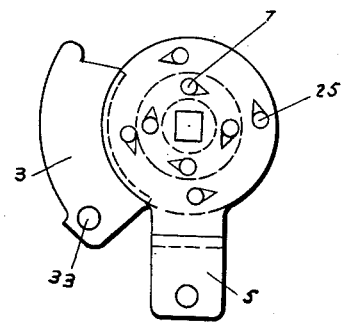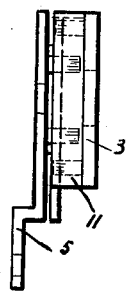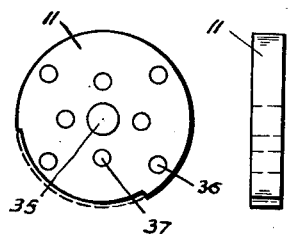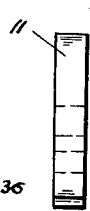
FIG.23  FIG.24  FIG.28/FIG.29  FIG.19  FIG.20
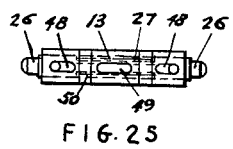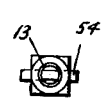
FIG.25  FIG.26
Charles Dumelin
INVENTOR.

United States Patent Office 2,698,947
Patented Jan. 11, 1955

2,698,947
KNEE COUPLING FOR ARTIFICIAL LEGS
Charles Dumelin, Detroit, Mich.
Application September 8, 1952, Serial No. 308,365
4 Claims. (Cl. 3—27)

My present invention relates to a knee coupling for artificial legs and the object is to provide a coupling for the purpose specified.

The invention consists in a coupling attached to an upper and lower leg casing forming the outer contour of the leg. The lower leg casing overlapping the upper one with a given clearance all around to balance the leg freely in its bending and swinging movement.

The coupling is provided with a shaft having a ball element assembly and two tension units attached therewith. The ball element assembly comprising a pair of plates spaced by an inner plate and ball elements seated therebetween. Said plate members having a pair of guide blocks and a pilot assembly attached to their bearing portions. The tension units located on the sides of the ball element assembly comprising a pair of flying plates and outer tension plates with a pair of soft rubber discs therebetween.

The plates having plurality pins extending through the rubber discs, and in bending the knee joint function in opposite directions to produce the required tension for walking.

The pilots of the pilot assembly connect the flying plates and release said latter at an increased bending of the knee joint. The disengaged tension units are particularly adapted to leave the lower leg in a vertical position while a person is in a seated position.

The invention consists in a coupling of the class and for the purpose specified which is simple in construction and operation and which is constructed as hereinafter described and claimed.

The invention is fully disclosed in this specification of which the accompanying drawing forms a part in which the separate elements are designated by suitable reference character in each of the views and in which:

Fig. 1 is a vertical elevation of the knee housing seated in its relative position about the leg. The coupling is positioned to co-ordinate with the normal knee movement of the opposite leg.

Fig. 2 is a vertical front elevation of the knee housing and coupling. The elements and parts are seated in their relative secured positions. The shaft is disposed horizontally across the knee joint and forms the pivotal point of the leg movement. Said shaft carries a ball element assembly and two tension units adjacent located on the outer sides of the ball element assembly. The outer tension plates are secured with the shaft and lower leg casing and the spaced members of the ball element assembly forming upper and lower bearing portions adapted to carry the pilot assembly at the base and brackets attached with the upper bearing portions and leg casing. The inner member of the ball element assembly having a pair of guide blocks mounted therewith.

Fig. 6 is an elevation view of the leg casings and coupling in their fully collapsed position. The tension units are disengaged by the pilots and the leg casings are pivotally connected together by the ball element assembly.

Fig. 7 and Fig. 8 are elevation views of the ball element assembly illustrating the inner member and ball elements seated in their respective positions in recesses in the spaced members and movable in circular grooves in the inner member. The spaced members are provided with upper and lower bearing portions and receive pins in the assembly.

Fig. 9 and Fig. 10 are elevation views of the inner member of the ball element assembly, it forms a bearing portion with a pair of guide blocks mounted therewith, in the final assembly of the coupling.

Figure 1:
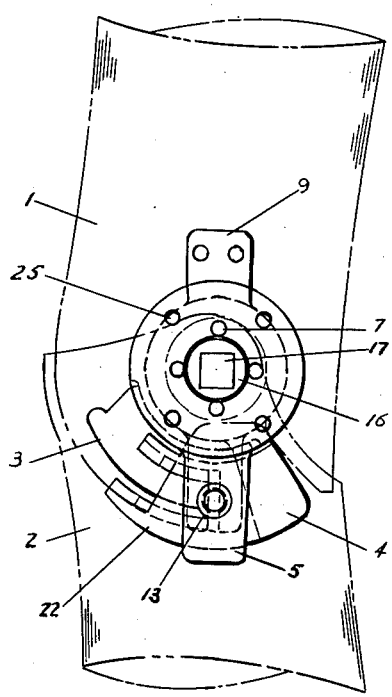

Fig. 11 and Fig. 12 are elevation views of a flying plate with plurality pins secured thereto. Said plate forms a depression and flange adapted to receive the pilot about its flying area. The plate is provided with a hole in the center to clear the shaft in the assembly, and another hole in the flange to receive the pilot in the movement of the leg.

Fig. 13 and Fig. 14 are elevation views of an outer tension plate with plurality pins secured thereto, the square hole in the center receives the bearing portion of the shaft in the assembly, the lower part of the plate forms a depression and flange adapted to be secured with the spacer block of the leg casing.

Fig. 15 and Fig. 16 are elevation views of a spaced member of the ball element assembly, it is provided with upper and lower bearing portions, ball receiving recesses, a clearance hole in the center to receive the shaft and a hole on each bearing portion to receive the pins in the assembly, the upper bearing portion has two holes for the bracket in the attachment of the coupling, the lower bearing portion has a square hole to receive the tube of the pilot assembly.

Fig. 17 and Fig. 18 are elevation views of a guide block. It has an arc shaped clearance to receive the pilot assembly in its swinging radius, the outer sides of said clearance have recessed grooves ending into angular portions, said guide block is provided with holes to receive pins in the attachment with the inner member of the ball element assembly. The reduced wall on the side with the recessed grooves gives the required clearance for the guide pins as shown in Fig. 10 of the drawing.

Fig. 19 and Fig. 20 are elevation views of a soft rubber disc with a hole in the center to receive the shaft and holes about the surface to receive the plurality pins of the flying plate and outer tension plate.

Fig. 21 and Fig. 22 are elevation views of the shaft with a bearing portion at each end and tapped holes to receive the lock-screws in the assembly of the tension units.

Fig. 23 and Fig. 24 are elevation views of a flying plate, an outer tension plate and a soft rubber disc therebetween. The flying plate is shown at its extreme tensioned position before it is released by the pilots, the exploded rubber disc is engaged by the plurality pins of both plate members.

Fig. 25 and Fig. 26 are elevation views of the pilot assembly illustrating the position of the parts in the final assembly of the coupling. It comprises a steel tube having square shoulders within the bearing portions of the spaced members of the ball element, a soft rubber filler and a pilot at each end of the tube slidably attached with guide pins. The tube is provided with elongated slots to receive the exploded rubber.

Fig. 27 and Fig. 28 are elevation views of a lock screw.

Fig. 29 is an elevation view of a pilot and guide pin.

In said drawing, 1 denotes the upper leg casing and 2 the lower leg casing. They have spacer blocks bearing about the inner surface.

The coupling is shown with a horizontally positioned shaft 17, a ball element assembly with 4 the inner member, 8 the ball elements and 9 the spaced members, 21 and 23 are pins used in the assembly.

The tension units include the flying plates 3, with plurality pins 25, a pair of rubber discs 11 and outer tension plates 5 with plurality pins 7.

The pilot assembly as shown in Fig. 25 and 26 of the drawing has a steel tube 50, a soft rubber filler 27, pilots 26 and guide pins 54.

The guide blocks 22 are best illustrated in Figs. 9 and 10 of the drawing.

Figure 2:
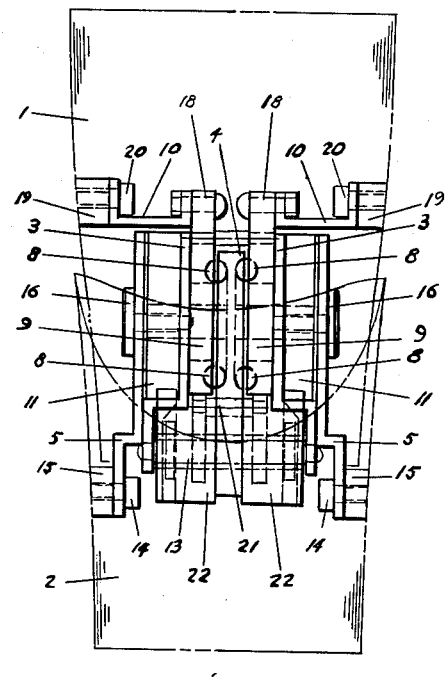
Figure 3:
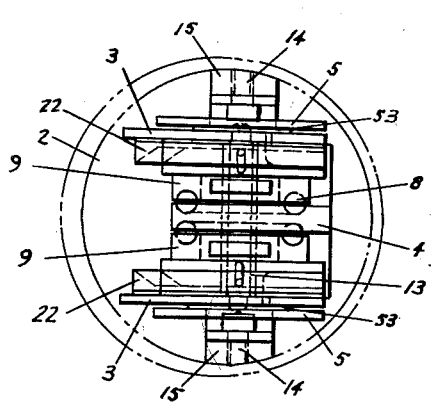
Fig. 3 is a horizontal view taken through the leg casings and pilot assembly. The pilots are shown extending into the flying plates of the tension units.
Figure 4:
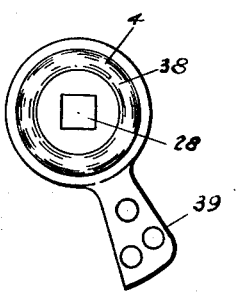
Fig. 4 and Fig. 5 are elevation views of the inner member of the ball element assembly, it is provided with a circular groove on each side and a square hole in the center to receive the shaft.
Figure 5:
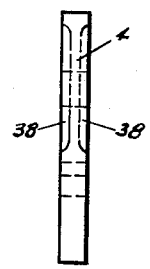

Brackets 10 connecting the bearing portions of members 9 and upper leg casing are shown in Figs. 2 and 3 of the drawing.

The coupling controls the walking movement by the members of the ball element assembly. In bending the knee joint, the inner member and spaced members function in opposite directions, the flying plates with their plurality pins inserted through the rubber discs and the pilots engaged with said plates operate together in one direction, the inner member of the ball element and the outer tension plates with their plurality pins inserted through the rubber discs operate together in the opposite direction.

The increased bending of the knee joint slidably moves the guide pins over the angular portions of the guide blocks and disengage the tension of the flying plates.

The self engagement of the coupling is fully controlled by the leg movement.

The coupling is assembled as shown in Figs. 2 and 3 of the drawing. The parts are particularly pointed out as they are received in the final assembly. Pins 21 and 23 are pressed into holes 32 of one spaced member 9 of the ball element assembly, one half of the ball element is received by recesses 31 and the inner member 4 with circular grooves 38 is put over the ball element, the second half of the ball element is put in the circular grooves and received by the recesses in the second spaced member, said latter is received by the pins and pressed into its secured position. The assembly is received by shaft 17 and square hole 28.

The steel tube 50 is inserted through square holes 34 in the bearing portions of the spaced members 9, the soft rubber filler 27 is inserted through the steel tube, the pilots 26 and guide pins 54 are secured with slots 48 at the ends of the tube.

The flying plates 3 with plurality pins 25 receive holes 36 of the rubber discs 11, and plurality pins 7 of the outer tension plates 5 are received by holes 37 of the rubber discs, the assembled tension units are received by the shaft and secured therewith about the bearing portion 46 with lock-screws 16.

The inner member 4 of the ball element assembly and guide blocks 22 are mounted with the bearing portion by pins 24 and holes 29, the guide pins of the pilots are slidably bearing in the recessed grooves in the guide blocks.

Plate members 9 have their upper bearing portion with holes 47 and screws 18 connected by brackets 10. Said brackets are received by the spacer blocks of the upper leg casing. And the outer tension plates have their flanges connected with the spacer blocks of the lower leg casing.

Further the structure of the coupling is such as to provide the upper and lower leg casing with rigidness while supporting and balancing the weight of a person.

From the above, it can be seen I have provided an exceptionally efficient, strong, reasonably inexpensive coupling for the purpose intended.

What I claim and desire to secure by Letters Patent is:

1. A knee coupling for artificial legs adapted to be secured to a knee housing having an upper and lower leg casing, the lower leg casing overlapping the upper one with a clearance all around at any angular position of the leg, and in their seated position, said casings form the outer contour of the leg within the knee section, the coupling having a three way engagement in its function, comprising a multiple ball element assembly, a tension unit on each side of the ball elements secured together with a shaft and lock-screws, a pilot assembly including a pair of guide blocks disposed at the base of the coupling, the circular grooves in said guide blocks, the multiple ball elements seated in recesses and moveable in elements between the plate members pivotally controlling the leg movements, the tension units comprising flying plates and outer tension plates spaced by a soft rubber disc controlling the walking movements of the leg, said flying plates and outer tension plates being provided with a plurality of pins passing through the rubber disc, so that in walking said pins engage each other in the opposite direction and produce the required tension about said rubber discs, the pilot assembly disengages the tension units at a given angular position of the leg, said pilot assembly disposed at the base of the coupling comprising a tube with a soft rubber filler inserted, and pilots slideably attached at the ends of the tube, said pilots having guide pins secured thereto, the latter extend through slots in the tube and into recessed grooves in the guide blocks, the grooves ending with angular portions adapted to disengage the pilots from the flying plate members, the spaced members of the ball elements forming bearing portion at the top and bottom of the coupling, the bottom bearing portions carry the pilot assembly and the top bearing portions being provided with holes to receive a set of brackets and screws, and in the assembly, said brackets being secured with the spacer blocks of the upper leg casing, the inner plate member of the ball elements forming an extension with a pair of guide blocks secured thereto, said plate member with a square hole to receive the shaft, the outer tension plates being provided with a square hole to receive the bearing portions of the shaft and lock-screws to secure the parts together, said outer tension plates having flanged portions bearing against the spacer blocks of the lower leg casing, and in the assembly of the coupling are secured therewith.

2. A knee coupling for artificial legs, adapted to be secured to a knee housing with an upper and lower leg casing, the lower leg casing overlapping the upper one with a given clearance all around, and in their seated position, said casings form the outer contour of the leg within the knee section, the coupling having a three way engagement in its function, means of a ball element assembly in the form of a pair of ball receiving plate members, spaced by an inner plate member having a circular groove on each side, the ball receiving members forming bearing portions at the top and bottom of the coupling, and in the assembly, said bearing portions being secured together with pins and hold the ball elements and inner member pivotally together, means of tension units on each side of the ball elements comprising a flying plate, an outer tension plate spaced by a soft rubber disc, the ball element assembly and tension units being secured together by a shaft and lock-screws, and means of a pilot assembly including a pair of guide blocks disposed at the base of the coupling adapted to disengage the tension within the rubber discs while in a seated position or climbing stairs, the arc shaped guide blocks in their secured position receive the pilot assembly extending into the flying plates, the pilot assembly disengage the tension of the rubber discs at a given angular position of the leg.

3. A knee coupling for artificial legs comprising a ball element assembly including a pair of spaced plate members, an inner plate member and multiple ball elements secured together with pins, a tension unit symmetrically opposite on each side of the ball elements carried by a shaft and secured together with lockscrews, each tension unit comprising a flying plate and tension plate spaced by a soft rubber disc, the flying plate and tension plate having plurality pins secured thereto and in the assembly said pins extend through the rubber disc, the outer tension plate having a recessed flange bearing against the spacer block of the leg casing and secured thereto, and means of a pilot assembly and a pair of arc shaped guide blocks disposed at the base of the coupling, the guide blocks being secured with the extension of the inner member of the ball element assembly, and the pilot assembly being secured with the bearing portions of the spaced members of the ball elements, the guide blocks in their secured position receive the pilot assembly extending into the flying plates, said guide blocks having a clearance in the radius of swing of the pilot assembly and recessed grooves disposed parallel about said radius, the grooves ending with an angular portion, and guide pins secured with the pilots slidably bearing about said recessed grooves and angular portions and disengage the flying plates.

4. A knee coupling for artificial legs comprising a ball element assembly and tension units secured together with a shaft and lock-screws, means of a pilot assembly including guide blocks disposed at the base of the coupling, the ball elements including a pair of ball receiving plate members spaced by an inner plate member with circular grooves adjacent the spaced members, and in the assembly said plate members being secured together with pins and pivotally control the leg movement, each tension unit comprising a flying plate, an outer tension plate spaced by a soft rubber disc to control the walking movement, the pilot assembly and guide blocks being secured with the members of the ball elements and in their secured position, the pilot assembly extending through the guide blocks into the flying plates to provide a tension release about the rubber discs while a person remains in a seated position, the pilot assembly comprising a tube carried by the spaced members of the ball elements, a soft rubber filler inserted into said tube, and pilots slidably inserted at each end of the tube, said pilots having guide pins secured therewith, said latter extend through slots in the tube and into recessed grooves of the guide blocks, the rubber filler having a continuous spring pressure and in its exploded form extends into slots in the tube.

No references cited.